US008073153B2

(12) United States Patent
Loeppert

(10) Patent No.: US 8,073,153 B2
(45) Date of Patent: Dec. 6, 2011

(54) SYSTEM AND METHOD FOR ENGAGING IN CONVERSATION WHILE USING AN EARPHONE

(75) Inventor: Peter V. Loeppert, Hoffmann Estates, IL (US)

(73) Assignee: Knowles Electronics, LLC, Itasca, IL (US)

( * ) Notice: Subject to any disclaimer, the term of this patent is extended or adjusted under 35 U.S.C. 154(b) by 1261 days.

(21) Appl. No.: 11/677,395

(22) Filed: Feb. 21, 2007

(65) Prior Publication Data

US 2008/0199029 A1 Aug. 21, 2008

(51) Int. Cl.
*H04R 1/10* (2006.01)
*H02B 1/00* (2006.01)

(52) U.S. Cl. ............. 381/74; 381/91; 381/122; 381/123

(58) Field of Classification Search .................. 381/309, 381/74, 123, 56, 57, 71.1, 71.6, 94.5, 384, 381/111–117, 91, 92, 122, 95, 120; 379/420.04, 379/421–423, 430
See application file for complete search history.

(56) References Cited

U.S. PATENT DOCUMENTS 4,406,920 A * 9/1983 Krauel, Jr. ...................... 381/80
4,633,498 A * 12/1986 Warnke et al. ............... 381/23.1
5,014,017 A * 5/1991 Ishiguro et al. ................ 330/51
5,692,050 A * 11/1997 Hawks .............................. 381/1
6,704,429 B2 3/2004 Lin
6,873,862 B2 3/2005 Reshefsky
6,885,754 B2 * 4/2005 Lazzeroni et al. ............ 381/384
7,187,948 B2 3/2007 Alden
2002/0067825 A1 6/2002 Baranowski et al.
2003/0073460 A1 4/2003 van Pelt et al.
2006/0182287 A1 8/2006 Schulein et al.
2007/0127747 A1 6/2007 Doyle

* cited by examiner

*Primary Examiner* — Xu Mei
(74) *Attorney, Agent, or Firm* — Fitch, Even, Tabin & Flannery

(57) ABSTRACT

A listening device for presenting at least one audio signal to a user comprises a first ear piece and a second ear piece, each of the first ear piece and the second ear piece including at least one speaker and each being adapted to block substantially all external sounds from entering an ear of a user. The device further comprises a microphone for sensing a first audio signal and a differential amplifier coupled to the microphone for amplifying the first audio signal. The differential amplifier is coupled to a first electrical ground. A switching arrangement coupled to and receiving a second audio signal from an external audio source and the external audio source having a second electrical ground that is electrically distinct from the first electrical ground. The switching arrangement is further coupled to the differential amplifier, the first ear piece, and the second ear piece, the switching arrangement being adapted to select at least one of the first audio signal and the second audio signal for transmission to the first ear piece and at least one of the first audio signal and the second audio signal for transmission to the second ear piece.

39 Claims, 5 Drawing Sheets

SYSTEM AND METHOD FOR ENGAGING IN CONVERSATION WHILE USING AN EARPHONE

BACKGROUND OF THE INVENTION

The use of personal headsets with any of the various audio and communication devices, including music players and cell phones is common today among consumers. With the advent of in-the-ear versions that substantially seal to the ear and isolate the user from outside sounds, there is a communication gap when someone wants to interrupt the user or the user wants to interact with the outside environment. In this case, the user is forced to remove at least one ear bud to hear anything other than the audio source. One situation where this occurs is when a jogger is running while listening to a music player and does not want to be completely isolated from outside sounds like traffic noise. Another situation is on an airplane where the user is listening to music and needs to interact with another passenger or a flight attendant. It is desirable to provide multiple audio streams to a user on demand.

BRIEF DESCRIPTION OF THE DRAWINGS

For a more complete understanding of the disclosure, reference should be made to the following detailed description and accompanying drawings wherein.

Figure 1:
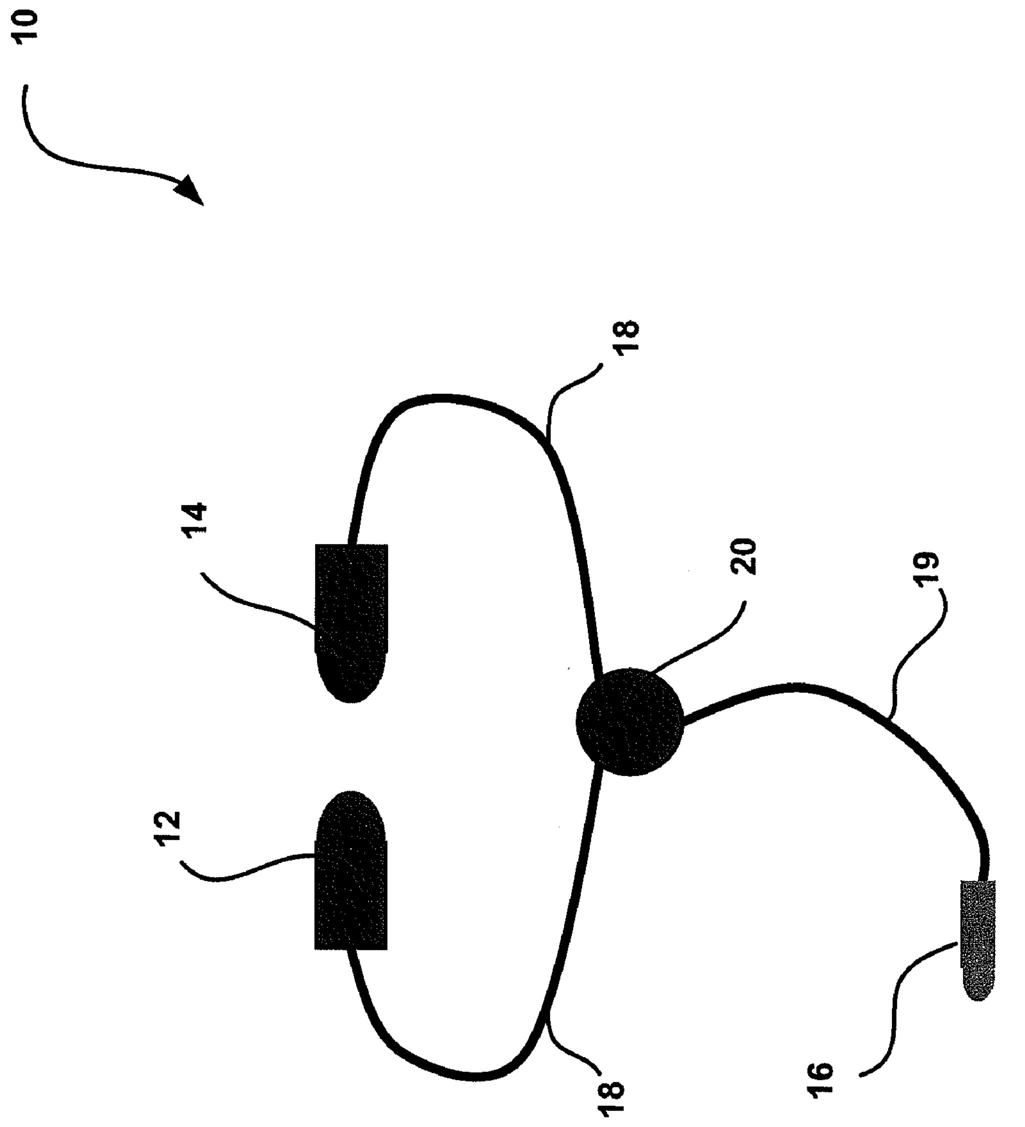
FIG. 1 illustrates an exemplary listening device, in accordance with an embodiment of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

While the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claims.

FIG. 1 illustrates an exemplary listening device 10, in accordance with an embodiment of the present invention. The listening device 10 may be an earphone, an earplug, a headphone, a wireless earphone, a wireless headset, a wireless headphone, a hearing aid, an insert earphone and the like. The listening device 10 may be used with various types of audio and portable communication devices such as MP3 players, laptops, personal computers, tablet PCs, cellular phones, CD players and the like. The listening device 10 operatively coupled to the device may be a stereophonic device, a monophonic device, or combination thereof. The listening device 10 comprises left and right earphones 12, 14, a user input device 20, and a connecting cord 19 that is terminated in a plug 16. The earphones 12, 14 may be electrically coupled to the user input device 20 via a cable 18. At least a transducer (not shown) is encapsulated in the earphones 12, 14. The transducer may be a receiver, a speaker, a combined receiver and microphone, or tandem receivers, depending on the desired applications. Normally, the left earphone 12 is placed in user's left ear and the right earphone 14 is placed in user's right ear. An ear mold or an ear tip (not shown) may be provided to increase the comfort seal in the ear and such ear mold can be identical to the conventional ear mold, which will not be discussed further. The plug 16 may be used to connect the earphones 12, 14 to the external device with an output port. The user input device 20 connected to the plug 16 via the connecting cord 19 may be utilized to select at least one audio signal. The user input device 20 comprises at least a switch arrangement (not shown) to selectively control between different modes to perform certain functions and will discussed in greater detail therein.

Figure 2:
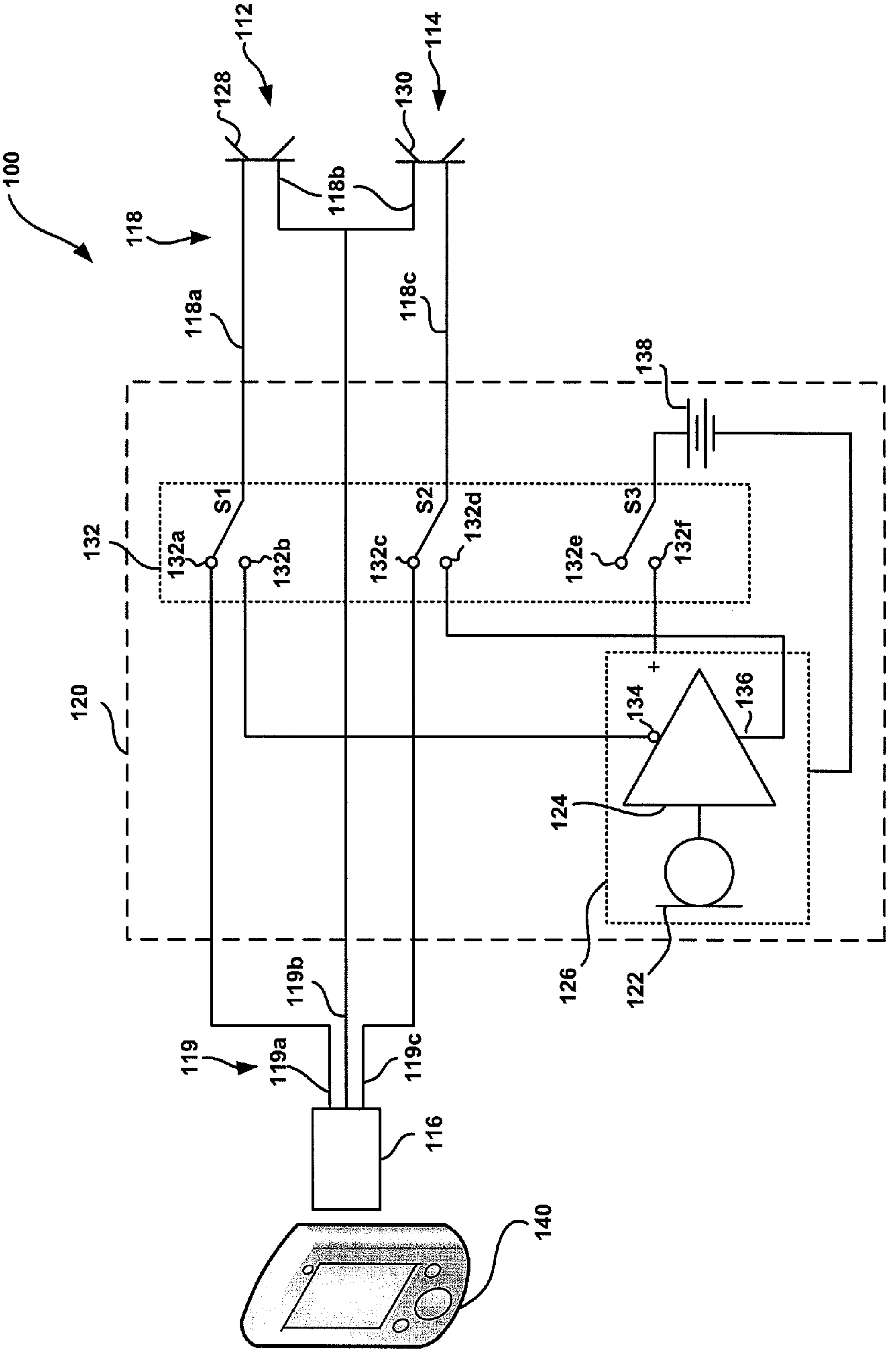
FIG. 2 illustrates an exemplary circuitry, in accordance with an embodiment of the present invention.

FIG. 2 illustrates a functional schematic of a listening device 100, in accordance with an embodiment of the present invention. The listening device 100 comprises a left terminal 119*a*, a right terminal 119*c*, and a common terminal 119*b* formed in a connecting cord 119. The listening device 100 further comprises a left terminal 118*a*, a right terminal 118*c*, and a common terminal 118*b* formed in a cable 118. A first speaker 128 is disposed in a left earphone 112 and a second speaker 130 is disposed in a right earphone 114. As shown, the first speaker 128 and the second speaker 130 shared the same common terminal 118*b* of the cable 118. A user input device 120 comprises a switch arrangement 132, a power source 138, a microphone 122, and a differential amplifier 124. The microphone 122 picks up acoustic input as heard in the environment, converts the acoustic signal into a corresponding electrical signal, and is electrically coupled to an input of the differential amplifier 124. The microphone 122 may be a silicon condenser microphone, an electret microphone, or a dynamic microphone, depending on the desired applications. The differential amplifier 124 may be integrated into the microphone 122, defining a differential microphone unit 126. The power source 138 may be a battery. The switch arrangement 132 comprises a left switch S1, a right switch S2, and a circuit switch S3 which are ganged to select between two audio sources. S1, S2, and S3 of the switch arrangement 132 may be mechanical switches such as toggle switches, slide switches, push button switches, rotary switches, or electronic (CMOS) switches and the like. A fixed end 132*a* of S1 is connected to a plug 116 via the left terminal 119*a* of the connecting cord 119 and a fixed end 132*b* of S1 is connected to a first output 134 of the differential amplifier 124. A fixed end 132*c* of S2 is connected to the plug 116 via the right terminal 119*c* of the connecting cord 119 and a fixed end 132*d* of S2 is connected a second output 136 of the differential amplifier 124. A movable end of S1 is coupled to an input of the first speaker 128 via the left terminal 118*a* of the cable 118 and a movable end of S2 is coupled to an input of the second speaker 130 via the right terminal 118*c* of the cable 118. A fixed end 132*f* of S3 is connected to the differential amplifier 124 and a movable end of S3 is connected to the power source 138.

The common terminal 118*b* of the cable 118 is electrically coupled to the common terminal 119*b* of the connecting cord 119 via the user input device 120 extending between the plug 116 and the first and second speakers 128, 130 of the earphones 112, 114. When the switch arrangement 132 is in the first position, the movable end of S1 is connected to the fixed end 132*a* and the movable end of S2 is connected to the fixed end 132*c*. The first and second speakers 128, 130 of the earphones 112, 114 are connected to the plug 116 to receive a first audio signal from an audio source 140. The movable end of S3 is connected to the fixed end 132*e* so that the power source 138 is disconnected from the differential amplifier 124. When the switch arrangement 132 is in the second position, the movable end of S1 is connected to the fixed end 132*b* and the movable end of S2 is connected to the fixed end 132*d*. The first and second speakers 128, 130 of the earphones 112, 114 are connected in series across the differential amplifier 124 to receive a second audio signal from the microphone 122. The movable end of S3 is connected to the fixed end 132*f* so that the power source 138 is connected to the differential amplifier 124. In doing so, the differential amplifier 124 of the circuit 126 provides a gain and output impedance of a magnitude that allows the driving of the first and second speakers 128, 130 of the earphones 112,114. One advantage of the device 100 is that, unlike the conventional circuits, the device 100 does not require any DC blocking capacitors between the outputs 134, 136 of the differential amplifier 124 and the speakers 128, 130 of the earphones 112, 114. Further the device 100 does not require a connection between the ground of the circuit 126 and the ground of the external audio device 140.

Figure 3:
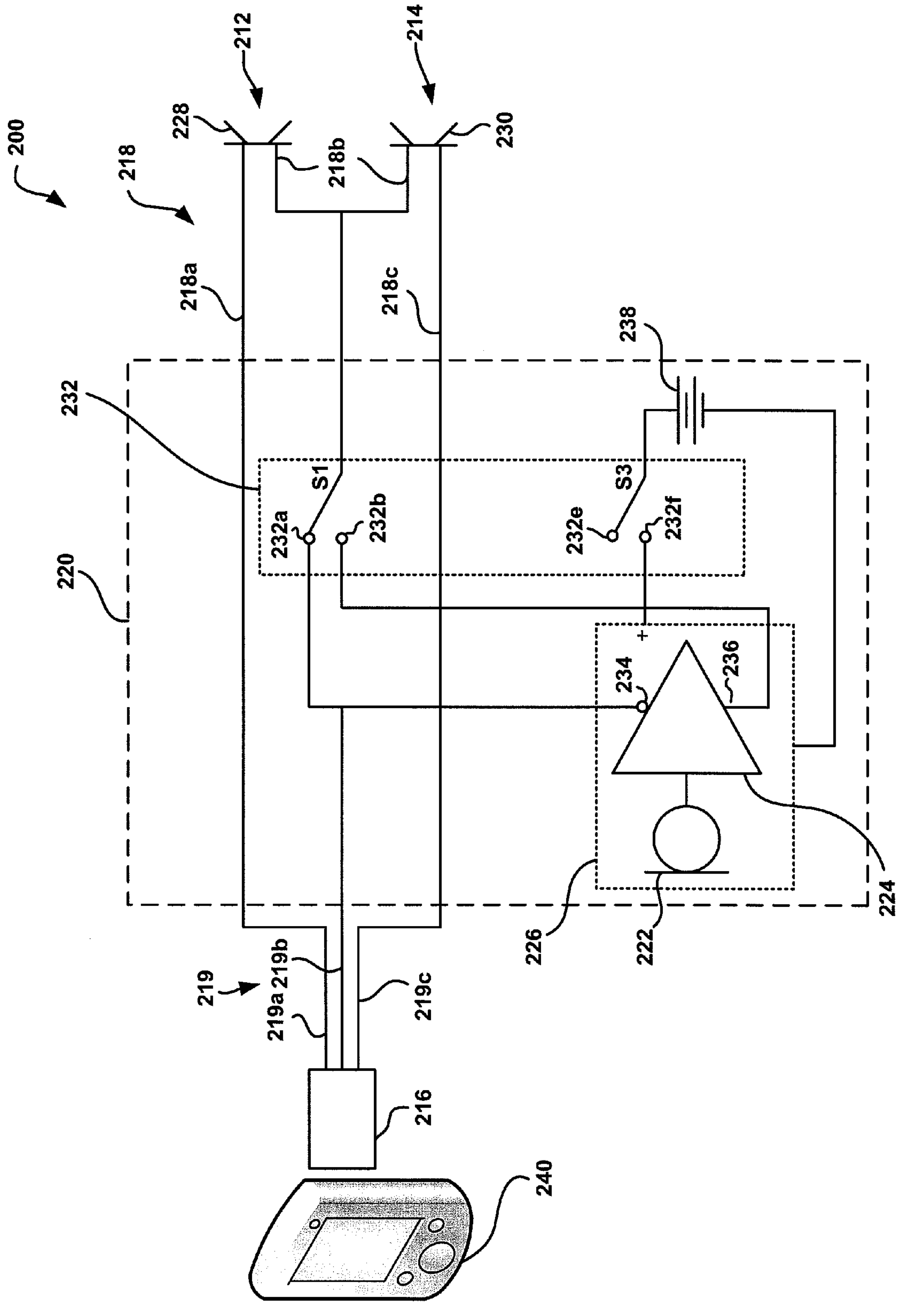
FIG. 3 illustrates another exemplary circuitry, in accordance with an embodiment of the present invention.

FIG. 3 illustrates another functional schematic of a listening device 200, in accordance with an embodiment of the present invention. FIG. 3 is similar in construction to the device 100 in FIG. 2 and like elements are identified with a like reference convention wherein, for example, element 120 corresponds to element 220. In this embodiment, a switch arrangement 232 comprises a common switch S1 and a circuit switch S3 which are ganged to select between two audio sources. A fixed end 232*a* of S1 is connected to a plug 216 via a common terminal 219*b* of a connecting cord 219 and a first output 234 of a differential amplifier 224. A fixed end 232*b* of S1 is connected to a second output 236 of the differential amplifier 224. A movable end of S1 is coupled to first and second speakers 228, 230 of the earphones 212, 214 via a common terminal 218*b* of a cable 218. A fixed end 232*f* of S3 is connected to the differential amplifier 224 and a movable end of S3 is connected to a power source 238. A left terminal 218*a* of the cable 218 being coupled to an input of the first speaker 228 is electrically coupled to a left terminal 219*a* of the connecting cord 219 via a user input device 220. A right terminal 218*c* of the cable 218 being coupled to an input of the second speaker 230 is electrically coupled to a right terminal 219*c* of the connecting cord 219 via the user input device 220. When the switch arrangement 232 is in the first position, the movable end of S1 is connected to the fixed end 232*a*. The common terminal 218*b* of the cable 218 between the first and second speakers 228, 230 of the earphones 212, 214 are connected to the common terminal 219*b* of the connecting cord 219 that is coupled to the plug 216 to receive a first audio signal from an audio source 240 and the movable end of S3 is connected to the fixed end 232*e* so that the power source 238 is disconnected from the differential amplifier 224. When the switch arrangement 232 is in the second position, the movable end of S1 is connected to the fixed end 232*b*. The common terminal 218*b* of the cable 218 between the first and second speakers 228, 230 of the earphones 212, 214 are connected to the output 236 of the differential amplifier 224 to receive a second audio signal from an microphone 222 and the movable end of S3 is connected to the fixed end 232*f* so that the power source 238 is connected to the differential amplifier 224. Since the second audio signal from the circuit 226 is in series with the first audio signal from the plug 216, the first and second signals are mixed together and the mixed signals are transmitted to the earphones 212, 214 thereof. The device 200, according to the present invention, allows the user an ability to simultaneously hear the electronically produced audio signal while at the same time hearing externally generated sound. One advantage of the device 200 is that, unlike the conventional circuits, the device 200 does not require any DC blocking capacitors between the outputs 234, 236 of the differential amplifier 224 and the speakers 228, 230 of the earphones 212, 214. Further the device 200 does not require a connection between the ground of the circuit 226 and the ground of the external audio device 240.

Figure 4:
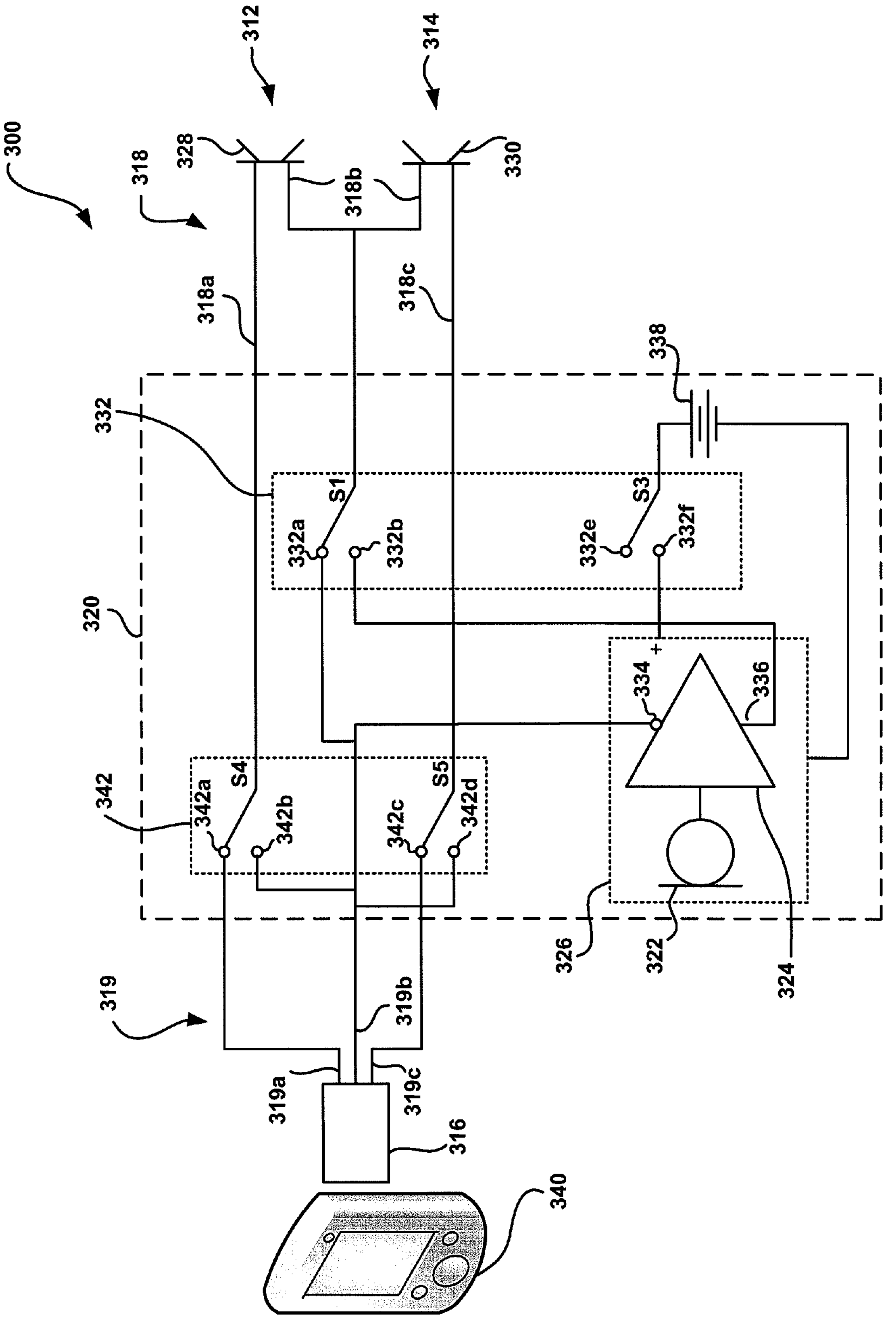
FIG. 4 illustrates another exemplary circuitry, in accordance with an embodiment of the present invention.

FIG. 4 illustrates yet another functional schematic of a listening device 300, in accordance with an embodiment of the present invention. FIG. 4 is similar in construction to the device 200 in FIG. 3 and like elements are identified with a like reference convention wherein, for example, element 220 corresponds to element 320. The listening device 300 comprises a left terminal 319*a*, a right terminal 319*c*, and a common terminal 319*b* formed in a connecting cord 319. The listening device 300 further comprises a left terminal 318*a*, a right terminal 318*c*, and a common terminal 318*b*. A first speaker 328 is disposed in a left earphone 312 and a second speaker 330 is disposed in a right earphone 314. The first and second speakers 328, 330 of the earphones 312, 314 shared the same common terminal 318*b* of the cable 318. A user input device 320 comprises a first switch arrangement 332, a second switch arrangement 342, a power source 338, a microphone 322, and a differential amplifier 324. As shown, the first switch arrangement 332 comprises a common switch S1 and a circuit switch S3 which are ganged together to operate in unison. The second switch arrangement 342 comprises a left switch S4 and a right switch S5 which are ganged together to operate in unison. A fixed end 342*a* of S4 is connected to a plug 316 via the left terminal 319*a* of the connecting cord 319. A fixed end 342*c* of S5 is connected to the plug 316 via the right terminal 319*c* of the connecting cord 319. Fixed ends 342*b*, 342*d* of S4, S5 are connected to the plug 316 via the common terminal 319*b*. A movable end of S4 is connected to an input of the first speaker 328 via the left terminal 318*a* of the cable 318. A movable end of S5 is connected to an input of the second speaker 330 via the right terminal 318*c* of the cable 318. A fixed end 332*a* of S1 is connected to the plug 316 via the common terminal 319*b* of the connecting cord 319. The fixed end 332*a* of S1 is further connected to a first output 334 of the differential amplifier 324. A fixed end 332*b* of S1 is connected to a second output 336 of the different amplifier 324. A movable end of S1 is connected to the first and second speakers 328, 330 of the earphones 312, 314 via the common terminal 318*b* of the cable 318. A fixed end 332*f* of S3 is connected to the differential amplifier 324 and a movable end of S3 is connected to the power source 338.

When the switch arrangements 332, 342 are in the first mode, the movable ends of S1, S3, S4, S5 are connected to the fixed ends 332*a*, 332*e*, 342*a*, 342*c*, the first and second speakers 328, 330 are connected to the plug 316 to receive a first audio signal from an external device 340 and the power source 338 is disconnected from the differential amplifier 324. When the switch arrangements 332, 342 are in the second mode, the movable ends of S1, S3, S4, S5 are connected to the fixed ends 332*b*, 332*f*, 342*a*, 342*c*, the first audio signal from the external device 340 via the plug 316 and a second audio signal from the microphone 322, defining a mixed first and second audio signals are received by the first and second speakers 328, 330. The power source 338 is connected to the differential amplifier 324 in the second mode. When the switch arrangements 332, 342 are in the third mode, the movable ends of S1, S3, S4, S5 are connected to the fixed ends 332*b*, 332*f*, 342*b*, 342*d*, only the second audio signal received by the microphone 322 is transmitted to the first and second speakers 328, 330 of the earphones 312, 314 and the power source 338 is connected to the differential amplifier 324. When the switch arrangements 332, 342 are in the fourth mode, the movable ends of S1, S3, S4, S5 are connected to the fixed ends 332*a*, 332*e*, 342*b*, 342*d*, no signal is presented to the first and second speakers 328, 330 of the earphones 312, 314 and thus silence is heard by the user. The power source 338 may be a unipolar supply which is advantageous from a manufacturing standpoint. Other examples of power source 338 are possible. In this embodiment, the DC level of the signals from differential amplifier 324 is between approximately 0.7V and Vdd-0.7V, where Vdd is the voltage of the power source 338. The power source 338 may be used to power CMOS switches used to implement switch arrangements 332 and 334 as the signals being switched are at an optimum voltage level.

Figure 5:
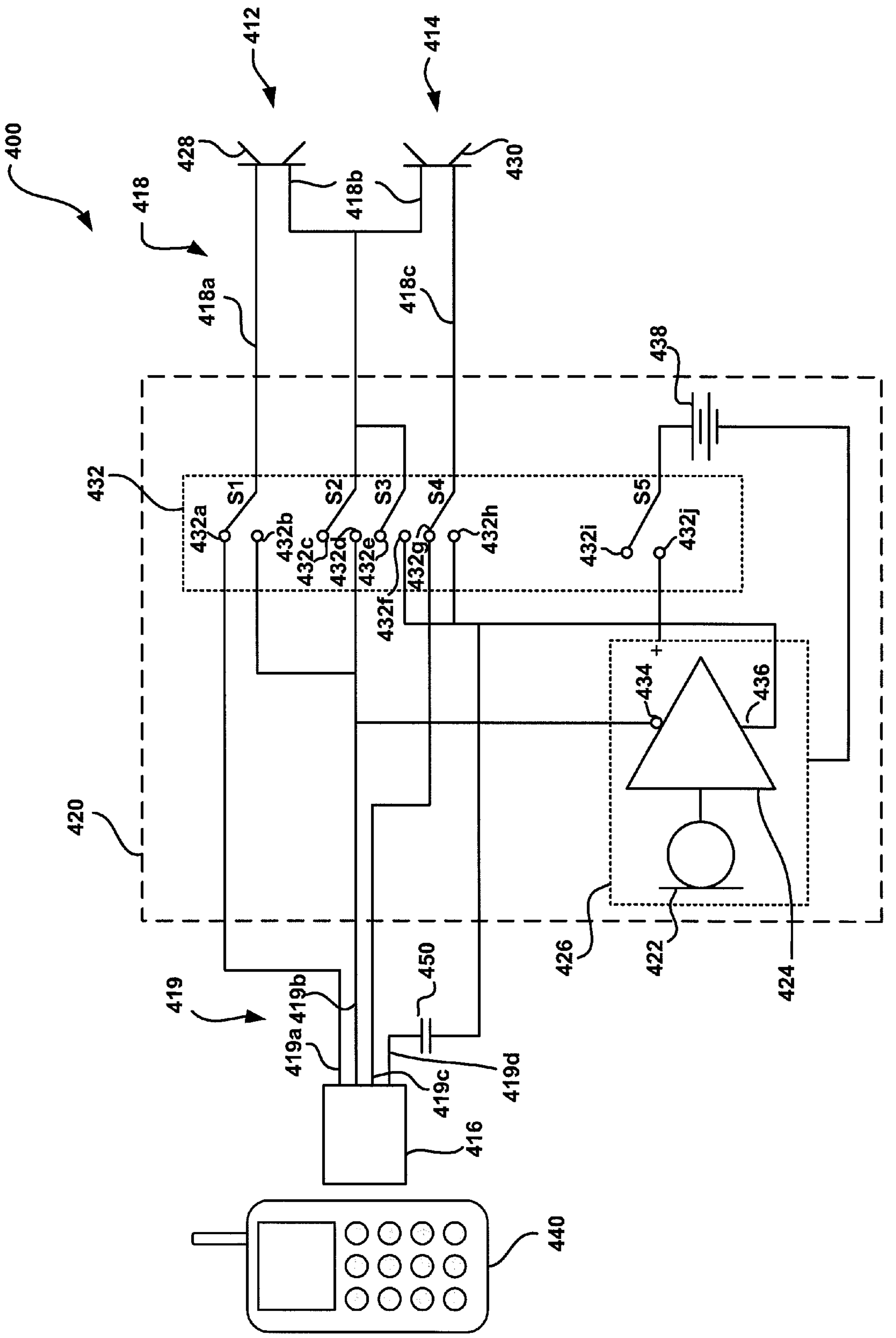
FIG. 5 illustrates another exemplary circuitry, in accordance with an embodiment of the present invention.

FIG. 5 illustrates still another functional schematic of a listening device 400, in accordance with an embodiment of the present invention. FIG. 5 is similar in construction to the device 300 in FIG. 4 and like elements are identified with a like reference convention wherein, for example, element 320 corresponds to element 420. The listening device 400 comprises a left terminal 419*a*, a common terminal 419*b*, a right terminal 419*c*, and a microphone terminal 419*d* collectively disposed in a connecting cord 419. The listening device 400 further comprises a left terminal 418*a*, a common terminal 418*b*, and a right terminal 418*c* collectively disposed in a cable 418. A user input device 420 comprises a switch arrangement 432, a power source 438, a microphone 422, and a differential amplifier 424. The switch arrangement 432 comprises a left switch S1, a first common switch S2, a second common switch S3, a right switch S4, and a circuit switch S5. A fixed end 432*a* of S1 is connected to a plug 416 via the left terminal 419*a* of the connecting cord 419 and a fixed end 432*b* of S1 is connected to both the common terminal 419*b* of the connecting cord 419 and a first output 434 of the differential amplifier 424. A movable end of S1 is connected to an input of the first speaker 428 via the left terminal 418*a* of the cable 418. A fixed end 432*d* of S2 is connected to both the common terminal 419*b* of the connecting cord 419 and a first output 434 of the differential amplifier 424. A fixed end 432*f* of S3 is connected to a second output 436 of the differential amplifier 424, and the microphone terminal 419*d* of the connecting cord 419 via the coupling capacitor 450. Movable ends of S2 and S3 are connected to the first and second speakers 428, 430 via the common terminal 418*b*. A fixed end 432*g* of S4 is connected to the right terminal 419*c* of the connecting cord 419. A fixed end 432*h* of S4 is connected to both an output 436 of the differential amplifier 424 and the microphone terminal 419*d* of the connecting cord 419 via coupling capacitor 450. A movable end of S4 is connected to an input of the second speaker 430 via the right terminal 418*c* of the cable 418. A fixed end 432*j* of S5 is connected to the differential amplifier 424 and the movable end of S5 is connected to the power source 438.

It is contemplated that the external device 440 is a cell phone with stereo MP3 functionality. When the switch arrangement 432 is in the first mode, also known as cell mode, the movable ends of S1, S2, S3, S4, and S5 are connected to fixed ends 432*a*, 432*d*, 432*e*, 432*g*, and 432*j* respectively, the first and second speakers 428, 430 are connected to the plug 416 via the terminals 419*a*, 419*b*, 419*c*, 418*a*, 418*b*, 418*c* to receive a first audio signal from an external device 440 while the power source 438 is connected to the circuit 426. Microphone 422 provides a signal to the external device 440 microphone input through the terminal 419*d* and the coupling capacitor 450. When the switch arrangement 432 is in the second mode, also known as MP3 mode, the movable ends of S1, S2, S3, S4, and S5 are connected to fixed ends 432*a*, 432*d*, 432*e*, 432*g*, and 432*i* respectively, the first and second speakers 428, 430 are connected to the plug 416 via the terminals 419*a*, 419*b*, 419*c*, 418*a*, 418*b*, 418*c* to receive the first audio signal from an external device 440 but no current is provided to the circuit 426. When the switch arrangement 432 is in the third mode, also known as mix mode, the movable ends of S1, S2, S3, S4, and S5 are connected to fixed ends 432*a*, 432*c*, 432*f*, 432*g*, and 432*j* respectively, and a mixed first and second audio signals from the external device 440 via the plug 416 and the microphone 422 of the circuit 426 are received by the first and second speakers 428, 430 via the terminals 419*a*, 419*b*, 419*c*, 418*a*, 418*b*, 418*c* while the power source 438 is connected to the circuit 426. When the switch arrangement 432 is in the fourth mode, also known as microphone mode, the movable ends of S1, S2, S3, S4, and S5 are connected to fixed ends 432*b*, 432*c*, 432*e*, 432*h*, and 432*j*, only the second audio signal received by the microphone 422 of the circuit 426 is transmitted to the first and second speakers 428, 430 while the current from the power source 458 is supplied to the differential amplifier 424.

To conserve the life of the power source when the microphone 422 is activated to receive audio signal as heard from the environment, an optional control member (not shown) is provided to the circuit 426 to set a predetermined time limit. The device 400 enters a sleep mode and thus a power switch is not required.

All references, including publications, patent applications, and patents, cited herein are hereby incorporated by reference to the same extend as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An apparatus for selectively supplying audio signals to at least one ear piece comprising:

a differential microphone circuit for sensing audio energy and forming a first audio signal from the sensed audio energy, the differential microphone circuit being coupled to a first circuit ground; and a switching arrangement having an output connected to the at least one ear piece, the switching arrangement being coupled to the differential microphone circuit and an external audio source, the external audio source being coupled to a second circuit ground and sending a second audio signal, the second circuit ground being electrically distinct from the first circuit ground, the switching arrangement being adapted to select at least one of the first audio signal, the second audio signal, and mix of the first audio signal and the second audio signal for presentation at the output of the switching arrangement.

2. The apparatus of claim 1 wherein the switching arrangement is adapted to selectively choose between presenting at least one of the first audio signal and the second audio signal to a first ear piece and at least one of the first audio signal and the second audio signal to a second ear piece.

3. The apparatus of claim 2 wherein the apparatus is positioned at a junction of a first cable and a second cable, the first cable connecting the apparatus to the first ear piece and the second cable connecting the apparatus to the second ear piece.

4. The apparatus of claim 3 wherein the apparatus and the first and second ear piece are coupled to a plug via a connecting cord, the connecting cord comprising a left terminal, a right terminal, and a common terminal.

5. The apparatus of claim 4 wherein the connecting cord further comprising a microphone terminal.

6. The apparatus of claim 1 further comprising a user interface for receiving user input, the user interface being coupled to the switching arrangement, the user input indicating a setting for the switching arrangement.

7. The apparatus of claim 6 wherein the user interface comprises at least one switch.

8. The apparatus of claim 1 wherein the differential microphone circuit comprises a differential amplifier and a microphone.

9. The apparatus of claim 8 wherein the differential amplifier is integrated into the microphone and provides a gain and output impedance of a magnitude that allows the driving of a speaker in the at least on ear piece.

10. The apparatus of claim 1 wherein the switching arrangement is further adapted to switch off power being supplied to the differential microphone circuit whenever the first audio signal is not chosen to be presented at the output.

11. The apparatus of claim 1 wherein the switching arrangement is further adapted to switch off power being supplied to the differential microphone circuit whenever the first audio signal and the second audio signal are not chosen to be presented at the output.

12. The apparatus of claim 1 wherein the switching arrangement is further adapted to switch on power being supplied to the differential microphone circuit whenever the first audio signal is chosen to be presented at the output.

13. The apparatus of claim 12 wherein a control member coupled between the switching arrangement and the differential microphone circuit for preserving the life of the power source at a predetermined time limit.

14. The apparatus of claim 1 wherein the switching arrangement is further adapted to switch on power being supplied to the differential microphone circuit whenever the mix of the first audio signal and the second audio signal are chosen to be presented at the output.

15. The apparatus of claim 1 wherein the switching arrangement is adapted to choose between the second audio signal and a mix of the first audio signal and the second audio signal.

16. The apparatus of claim 15 wherein the switching arrangement is further adapted wherein the first signal and the second signal are not chosen to be presented at the output.

17. The apparatus of claim 1 wherein the second audio signal comprises an audio signal representing music.

18. The apparatus of claim 1 wherein the first audio signal comprises an audio signal originating from an environment outside of the apparatus.

19. The apparatus of claim 1 wherein the switching arrangement comprises at least one mechanical switch.

20. The apparatus of claim 1 wherein the switching arrangement comprises at least one electronic switch.

21. The apparatus of claim 1 being incorporated into a listening device.

22. The apparatus of claim 21 wherein the listening device is selected from a group consisting of an earphone, an earplug, a headphone, an insert earphone, or a hearing aid.

23. A system for presenting at least one audio signal to a user comprising:

a first ear piece and a second ear piece, each of the first ear piece and the second ear piece including at least one speaker and each being adapted to block substantially all external sounds from entering an ear of a user;

a microphone for sensing a first audio signal;

a differential amplifier coupled to the microphone for amplifying the first audio signal and, the differential amplifier being coupled to a first electrical ground; and a switching arrangement coupled to and receiving a second audio signal from an external audio source, the external audio source having a second electrical ground that is electrically distinct from the first electrical ground, the switching arrangement being further coupled to the differential amplifier, the first ear piece, and the second ear piece, the switching arrangement being adapted to select at least one the first audio signal, the second audio signal, and a mix of the first audio signal and the second audio signal for transmission to the first ear piece and at least one the first audio signal, the second audio signal, and a mix of the first audio signal and the second audio signal for transmission to the second ear piece.

24. The system of claim 23 wherein the microphone, differential amplifier, and switching arrangement are positioned at a junction of a first cable and a second cable, the first cable connecting the apparatus to the first ear piece and the second cable connecting the apparatus to the second ear piece.

25. The system of claim 23 further comprising a user interface being coupled to the switching arrangement for receiving user input indicating a setting for the switching arrangement.

26. The system of claim 25 wherein the user interface comprises at least one switch.

27. The system of claim 23 wherein the differential amplifier is integrated into the microphone and provides a gain and output impedance of a sufficient magnitude to drive a first speaker in the first ear piece and a second speaker in the second ear piece.

28. The system of claim 23 wherein the switching arrangement is further adapted to switch off power being supplied to the differential amplifier whenever the differential amplifier is not chosen to supply the first audio signal at the output.

29. The system of claim 23 wherein the switching arrangement is further adapted to switch off power being supplied to the differential microphone circuit whenever the first audio signal and the second audio signal are not chosen to be presented at the output.

30. The system of claim 23 wherein the switching arrangement is further adapted to switch on power being supplied to the differential microphone circuit whenever the first audio signal is chosen to be presented at the output.

31. The system of claim 30 wherein a control member coupled between the switching arrangement and the differential microphone circuit for preserving the life of the power source at a predetermined time limit.

32. The system of claim 23 wherein the switching arrangement is further adapted to switch on power being supplied to the differential microphone circuit whenever a mix of the first audio signal and the second audio signal are chosen to be presented at the output.

33. The system of claim 23 wherein the switching arrangement is adapted to choose between the second audio signal and a mix of the first audio signal and the second audio signal.

34. The system of claim 33 wherein the switching arrangement is further adapted wherein the first signal and the second signal are not chosen to be presented at the output.

35. The system of claim 23 wherein the second audio signal comprises an audio signal representing music.

36. The system of claim 23 wherein the first audio signal comprises an audio signal originating from an environment outside the apparatus.

37. The system of claim 23 wherein the switching arrangement comprises at least one mechanical switch.

38. The system of claim 23 wherein the switching arrangement comprises at least one electronic switch.

39. The system of claim 23 wherein the system is selected from a group consisting of an earphone, an earplug, a headphone, an insert earphone, or a hearing aid.

* * * * *

UNITED STATES PATENT AND TRADEMARK OFFICE

CERTIFICATE OF CORRECTION

PATENT NO. : 8,073,153 B2
APPLICATION NO. : 11/677395
DATED : December 6, 2011
INVENTOR(S) : Peter V. Loeppert It is certified that error appears in the above-identified patent and that said Letters Patent is hereby corrected as shown below:

Column 1 (Inventor), delete "Hoffmann" and insert --Hoffman--, therefor.

Claim 23, Column 8, Line 41, delete "one the" and insert --one of the--, therefor.
Claim 23, Column 8, Line 44, delete "one the" and insert --one of the--, therefor.

Signed and Sealed this
Third Day of April, 2012

David J. Kappos
*Director of the United States Patent and Trademark Office*